United States Patent [19]

Kitamura et al.

[11] 4,407,866
[45] Oct. 4, 1983

[54] PROCESS FOR COATING CHOPPED STRAND OF GLASS FIBER WITH THERMOSETTING RESIN

[75] Inventors: Tadanori Kitamura; Nobuyuki Takao, both of Fukushima, Japan

[73] Assignee: Nitto Boseki Co., Ltd., Fukushima, Japan

[21] Appl. No.: 362,065

[22] Filed: Mar. 26, 1982

[30] Foreign Application Priority Data

Apr. 2, 1981 [JP] Japan .................................. 56-49938

[51] Int. Cl.³ ............................................. B32B 7/02
[52] U.S. Cl. .................................. 427/221; 427/336; 427/346; 427/352; 427/353
[58] Field of Search ............... 427/221, 336, 346, 352, 427/353

[56] References Cited

U.S. PATENT DOCUMENTS

| | | | |
|---|---|---|---|
| 2,829,982 | 4/1958 | Hoyt | 427/221 |
| 3,677,804 | 7/1972 | Kalnin et al. | 427/221 |
| 3,935,339 | 1/1976 | Cooke | 427/221 |
| 3,969,547 | 7/1976 | Isawa et al. | 427/221 |
| 4,176,105 | 11/1979 | Miedaner | 427/221 |
| 4,314,599 | 2/1982 | Luhleich et al. | 427/221 |

Primary Examiner—Norman Morgenstern
Assistant Examiner—Janyce A. Bell
Attorney, Agent, or Firm—Marvin Bressler

[57] ABSTRACT

This invention provides a process for coating chopped strand of glass fiber with a thermosetting resin in an individually separated state which comprises dispersing chopped strand of glass fiber impregnated with a solution of thermosetting resin into an aqueous medium and then carrying out a removal of solvent. By this process, a pellet-formed glass fiber base material thickly coated with said thermosetting resin and free from filamentation and fuzzy of glass fiber can be obtained by a simple procedure.

11 Claims, No Drawings

PROCESS FOR COATING CHOPPED STRAND OF GLASS FIBER WITH THERMOSETTING RESIN

This invention relates to a process for coating chopped strand of glass fiber with a thermosetting resin, and more particularly to a process for coating, with a particular thickness, chopped strand of glass fiber in an individually separated state with a thermosetting resin which comprises dispersing the chopped strand impregnated with a solution of thermosetting resin into an aqueous medium and then removing the solvent.

Glass fiber-blended thermosetting resins such as glass fiber-blended phenolic resin are extensively used as various molding materials such as molding material for forming electric instrument parts or impact-resistant molding material. Further, with the current tendency of decreasing the weight of automobiles, they are watched with interest as substitute for metals.

These glass fiber-blended thermosetting resin type molding materials are produced by the premix process which comprises previously mixing and kneading chopped strand of glass fiber and thermosetting resin to form a press-molding compound or an injection-molding compound or by the coating process which comprises dipping glass fiber strand into resin solution to coat the strand with the solution, solidifying the resin and then cutting the strand. However, in the case of premix process, it is practically impossible to produce a resin compound having a high content of glass fiber. For example, if chopped strand of glass fiber is blended into resin in an amount of 30% by weight or more, filamentation of chopped strand takes place and the compound increases its apparent viscosity and becomes bulky, so that the molding becomes difficult to practise and, at the same time, the molded article cannot have the intended characteristic properties such as high strength, high stiffness and high heat resistance. On the other hand, the coating process has been developed for thickly coating glass fiber strand with resin. However, this process has problems in both phases of material characteristics and productivity such that resin cannot easily be filled and coated between the filaments constituting strand completely and uniformly, that the coated strand is difficult to cut, that glass fiber becomes exposed upon cutting and that the speed of coating is low. Thus, this process cannot be said to be satisfactory industrially.

Apart from them, in the field of thermoplastic styrene resin, there has been developed a process for thickly coating chopped strand with styrene type resin by the pearl polymerization process which comprises polymerizing a styrene type monomer in an aqueous medium containing a suspension stabilizer in the presence of chopped strand of glass fiber in a specified reactor in a specified state of high speed agitation (for example, Japanese Patent Publication No. 27,663/74). According to this process, a pellet-formed product of chopped strand thickly coated with styrene resin can be obtained, so that it can be considered fairly successful. However, regarding thermosetting resins, no industrial process of suspension polycondensation is known, and therefore glass fiber cannot be coated with thermosetting resin by a pearl polymerization process such as mentioned above.

Apart from the above-mentioned resin coating process by the pearl polymerization of styrene monomer, a process for coating glass fiber chopped strand with thermoplastic resin itself is also known. Thus, in Japanese Patent Application Kokai (Laid-Open) No. 137,923/80, there is disclosed a process which comprises mixing chopped strand of glass fiber with an aqueous emulsion or suspension of thermoplastic resin, bringing the mixture to a semi-dried state by partially evaporating the water, breaking the resulting semi-dried mass into small pieces and then drying them. However, it is difficult to uniformly coat the fibers in strand with a resin emulsion or suspension. Further, this process is doubtlessly unable to coat chopped strand with resin in an individually separated state, and the large mass after the semi-drying must be broken into small pieces which themselves are considered to involve several chopped strands. Further, such a breaking treatment necessitates to control the drying conditions. At the same time, the resin must be fragile in order to enable the breaking treatment, so that the resin is probably limited to styrene type resins mentioned in the examples of the cited specification. In other words, thermosetting resins which must be handled in the state of A-stage or B-stage are considered inapplicable to the process.

The first object of the present invention consists in providing a thermosetting resin-coated product of glass fiber chopped strand which can be used in molding processes either in itself or in the form of a simple dry blend with a thermosetting resin.

The second object of this invention consists in providing a process for producing said coated product by a simple process without using any particular apparatus.

For achieving the above-mentioned objects, the process of this invention for coating chopped strand of glass fiber with a thermosetting resin fundamentally comprises dipping chopped strand of glass fiber into a solution of thermosetting resin to impregnate the chopped strand with the resin solution, separating the impregnated chopped strand, stirring the impregnated chopped strand in an aqueous medium for the sake of dispersing the impregnated chopped strand and removing the solvent of resin solution from the resin solution contained in the chopped strand into the aqueous medium, then separating the chopped strand coated with the desolvated resin from the aqueous medium, and drying the chopped strand.

In the above-mentioned process of this invention, the chopped strand of glass fiber (hereinafter, simply referred to as "chopped strand") is formed by cutting a strand which has been spun from bushing, coated with a sizing compound, bundled and wound up. Said sizing compound may be conventional one for glass fiber which is usually constituted of a film former, a coupling agent and a lubricant. Though the term "chopped strand" has no critical meaning, a chopped strand having a cut length of 1.5–25 mm and comprising 100–4,000 filaments having a diameter of 7–23$\mu$is usually employed.

The chopped strand is impregnated with a solution of thermosetting resin. The impregnation can be achieved by simply dipping the chopped strand into the resin solution. At this time, an impregnation time period of about 10 minutes is usually enough for a sufficient impregnation of the inside of chopped strand with the resin solution. The amount of impregnation should be determined with consideration of resin concentration in the resin solution and the intended coating amount of resin in the final product. It is usually preferable, however, to select the amount of impregnation so as to give a non-volatile resin weight of about 10–50 parts by weight per 100 parts by weight of chopped strand when a resin solution having a resin concentration of about 50–80% by weight is used. If the content of non-volatile resin is less than 10% by weight, the coating on glass fiber can become uneven, so that such a product is undesirable as a molding material. If the amount of impregnation exceeds 50% by weight, the loss of resin in and after the next step increases, which is undesirable economically. A more preferable amount of impregnation is about 20–35 parts by weight of non-volatile resin per 100 parts by weight of chopped strand. Preferably, impregnation (for example, using vacuum dryer) is carried out at the time of dipping the chopped strand.

As the solution of thermosetting resin for impregnating chopped strand, commercially available resin solution can be used as it is. Otherwise, the solution may be prepared and used by dissolving a thermosetting resin into an appropriate solvent. The concentration of resin in the resin solution should be determined with consideration of the amount of impregnation and the coating amount on chopped strand. A concentration of about 50–80% by weight is usually employed, and a concentration of about 60–70% by weight is preferably employed. Optionally, assistants for molding, such as release agent and/or curing catalyst, may be added to the resin solution.

In this invention, well known thermosetting resins can be used as the thermosetting resin. As examples of said thermosetting resin, phenolic resin, epoxy resin, unsaturated polyester resin and diallyl phthalate resin can be referred to. Phenolic resin includes resol type and novolac type, both of which can be used. Since these resins are used in the form of a solution, they must be in the state of A-stage. The solvent for dissolving these resins may be any well known polar solvent, so far as they are soluble or miscible with the aqueous medium used in the next step. As examples of said solvent, methanol, acetone, diacetone alcohol, dioxane and dimethylformamide can be referred to. These solvents may be used either alone or in the form of a mixture of two or more solvents.

The chopped strand impregnated with the solution of thermosetting resin is separated from the resin solution by, for example, screening, after which it is thrown into an aqueous medium with stirring. At the time of or subsequently to the separation from the resin solution, the chopped strand impregnated with the resin solution may optionally be squeezed to regulate the amount of impregnation. It is surprising that, by the throwing of the resin solution-impregnated chopped strand into aqueous medium and the stirring, the chopped strand is uniformly dispersed into the aqueous medium in a state of being separated individually and impregnated with the resin solution and, by the throwing and the dispersion, a removal of solvent from the resin solution contained in chopped strand into the aqueous medium takes place.

In the above-mentioned step of dispersion, the proportion of the aqueous medium to the impregnated chopped strand must not be so small as to inhibit the dispersion of chopped strand, but it is not particularly limited so far as it is not so small as mentioned above. From the practical point of view, however, it is not desirable to use too large an amount of aqueous medium because it results in increasing the size of apparatus. In general, the aqueous medium is used at a ratio (by weight) of about 10:1 to 10:3 to the impregnated chopped strand.

As for the stirring at the time of dispersion, a strong stirring is unnecessary, but a stirring of about 100–300 rpm is usually enough. However, since the necessary strength of stirring is also dependent on the amount of aqueous medium and the concentration of dispersion, it is practically recommendable to regulate it at an appropriate value while observing the state of dispersion. By this stirring, the resin solution contained in chopped strand can partially move into the dispersion medium to make the system turbid, sometimes. However, this phenomenon, in itself, exercises no substantial influence upon the coating on chopped strand. On the other hand, the resin solution which has been transferred as above is adsorbed on the chopped strand and the dispersion medium becomes transparent, when temperature of the system is elevated.

Although the temperature of dispersion medium at which the impregnated chopped strand is dispersed is not particularly critical, a lower temperature is generally more preferable because it gives a better state of dispersion. Usually, a sufficiently good dispersion can be achieved at a temperature of about 10° C. to 30° C. Though the dispersion can be achieved by continuing the stirring for a time period enough to achieve the removal of solvent at such a temperature, it is more preferable to obtain a uniform dispersion state at a low temperature and thereafter to elevate the temperature to a higher temperature which is usually about 40° C. to 70° C. and particularly 45° C. to 50° C. By this elevation of temperature, the removal of solvent is promoted and, at the same time, the resin solution which has transferred into aqueous medium as has been mentioned above becomes adsorbable on the chopped strand. Further, in the case of phenolic resin exhibiting some stickiness at the time of dispersion, a polymerization of phenolic resin from A-stage to B-stage progresses by the above-mentioned elevation of temperature to eliminate the problem of stickiness, which is a more preferable embodiment of this invention. However, if the temperature is elevated excessively, the resin solution-impregnated chopped strand can sometimes form a mass to obstruct the formation of a complete resin coating. In such a case, the formation of mass can be prevented by adding an effective amount of dispersing agent previously, by which a uniform state of dispersion can be maintained even at an elevated temperature. Dispersing agent can be used not only in such a case but also for the purpose of promoting the dispersion in the early state. As said dispersing agent, well known ones such as water-soluble polymers (for example, polyvinyl alcohol) can be used. As for the amount of said dispersing agent, an amount falling in the conventional range is enough. Usually, its about 0.1–1.0% by weight is added to aqueous medium.

Dispersion time is a time period required for removing the substantially whole quantity of the solvent present in the impregnating resin solution into aqueous medium. Usually a period of about 30–90 minutes is enough.

After completing the dispersion and the removal of solvent and, when the dispersion system has been heated to an elevated temperature in the step of dispersion, after allowing the system to cool preferably to room temperature, the chopped strand coated in an individually separated state with the resin deposited upon removal of solvent is separated from the dispersion system. The separation can be practised by usual method, such as filtration including screening process. The resin-coated chopped strand thus separated can be dried by any method, such as hot air drying. Though it is usually preferable to carry out the drying at a temperature of about 40°–60° C., it is also allowable to carry out the drying at a higher temperature in order to advance the polycondensation of resin to some extent and thereby to shorten the cycle time for molding. However, a drying temperature exceeding 100° C. is undesirable even in such a case.

Thus, according to this invention, chopped strand of glass fiber can be coated with thermosetting resin by a simple apparatus and by simple procedures of impregnation, dispersion, separation and drying and in a short period of time. According to such coating process of this invention, a pellet-formed base material of glass fiber which is free from filamentation and fuzzy causing the troubles in the forming process of glass fiber, which is uniformly filled and coated with thermosetting resin to the deep inside of strand and particularly which coated thickly can be obtained. The glass fiber base material of this invention can be subjected to press-molding or transfer-molding either directly in itself alone or in the form of a dry blend with thermosetting resin pellet containing no glass fiber, and thereby there can be obtained a molded article having an intended high glass fiber content of, for example, 50–90% by weight and particularly advantageously 60–80% by weight and exhibiting good surface characteristics even at such a high glass fiber content.

Next, this invention will be explained in more detail with reference to examples, which are presented in no limitative way but only in an illustrative way.

EXAMPLE 1

One hundred parts by weight of chopped strand having a cut length of 6 mm which had been prepared from a glass fiber strand comprising 800 filaments having a diameter of 13$\mu$ and treated with a sizing compound composed mainly of polyvinyl acetate emulsion was dipped and impregnated with 60 parts by weight of a methanolic solution of novolac type phenolic resin having a non-volatile resin content of 60% by weight. After separating the impregnated chopped strand, it was thrown into 1,000 parts by weight of aqueous medium kept at 20° C. and stirred to bring the impregnated chopped strand into a uniformly dispersed state, after which it was heated to 50° C. and stirred at this temperature for an additional one hour to complete the removal of solvent and the deposition of resin. After allowing this dispersion system to cool to room temperature, the resin-coated chopped strand was separated by filtration and dried at 40° C. with hot air. In the resin-coated chopped strand thus obtained, almost all the chopped strands were uniformly filled and coated with the phenolic resin by every chopped strand to the deep inside, and the amount of the resin was 25% by weight.

The above-mentioned resin-coated chopped strand was directly press-molded at 150° C. to obtain a test specimen having a length of 126 mm, a width of 12.6 mm and a thickness of 6 mm. The molded plate of glass fiber-reinforced phenolic resin thus obtained was very good in its surface characteristics and had as high Charpy impact strength as 45 kg-cm/cm$^2$.

EXAMPLE 2

One hundred parts by weight of chopped strand having a cut length of 13 mm which had been prepared from the same glass fiber strand as in Example 1 treated with a sizing compound composed mainly of polyurethane emulsion was dipped and impregnated with 75 parts by weight of a methanolic solution of resol type phenolic resin having a non-volatile resin content of 60%. Then it was dispersed and dried in the same manner as in Example 1 to obtain a phenolic resin-coated chopped strand uniformly filled and coated with the resin and having a resin content of 30%. This resin-coated chopped strand was press-molded in the same manner as in Example 1 to obtain a test specimen having a glass fiber content of 70% which was good in surface characteristics and had Charpy impact strength of 80 kg-cm/cm$^2$.

What is claimed is:

1. A process for coating chopped strands of glass fiber with thermosetting resin which comprises dipping chopped strands of glass fiber in a solution of thermosetting resin of A-stage in a polar solvent soluble or miscible with an aqueous medium to impregnate the chopped strand with the resin solution, separating the impregnated chopped strand, stirring the impregnated chopped strand in the aqueous medium to disperse the impregnated chopped strand and to remove the solvent present in the resin solution contained in the chopped strand into the aqueous medium, separating the chopped resin coated with the desolvated resin form the aqueous medium, and drying the chopped strand.

2. A coating process according to claim (1), wherein the dispersion of chopped strand of glass fiber impregnated with resin solution in an aqueous medium and the removal of solvent are carried out in the temperature range of 10°–30° C.

3. A coating process according to claim (1), wherein the chopped strand of glass fiber impregnated with resin solution is first dispersed into an aqueous medium having a temperature of 10° C. to 30° C., then temperature is elevated to 40° C. to 70° C. and the dispersion and removal of solvent are carried out at this temperature.

4. A coating process according to claim (3), wherein the temperature after elevation is 45°–50° C.

5. A coating process according to any one of claims 1-4, wherein said aqueous medium contains a dispersing agent.

6. A coating process according to claim (5), wherein said dispersing agent is a water-soluble polymer.

7. A coating process according to claim (6), wherein said water-soluble polymer is polyvinyl alcohol.

8. A coating process according to claim 1, wherein said solution of thermosetting resin contains a molding assistant.

9. A coating process according to claim (8), wherein said molding assistant is a release agent and/or curing catalyst.

10. A coating process according to claim 1, wherein said thermosetting resin is phenolic resin.

11. A coating process according to claim 1, wherein said polar solvent is selected from the group consisting of methanol, acetone, diacetone alcohol, dioxane, dimethylformamide and mixtures thereof.

* * * * *